US012786935B2

(12) United States Patent
Zheng et al.

(10) Patent No.: US 12,786,935 B2
(45) Date of Patent: Nov. 3, 2026

(54) SYSTEMS AND METHODS FOR MEASUREMENTS ON POSITIONING REFERENCE SIGNALS

(71) Applicant: ZTE CORPORATION, Shenzhen (CN)

(72) Inventors: Guozeng Zheng, Shenzhen (CN); Chuangxin Jiang, Shenzhen (CN); Yu Pan, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 274 days.

(21) Appl. No.: 18/621,238

(22) Filed: Mar. 29, 2024

(65) Prior Publication Data

US 2024/0284389 A1 Aug. 22, 2024

Related U.S. Application Data

(63) Continuation of application No. PCT/CN2021/122021, filed on Sep. 30, 2021.

(51) Int. Cl.
*H04W 64/00* (2009.01)
*H04L 5/00* (2006.01)
*H04W 8/22* (2009.01)
*H04W 76/20* (2018.01)

(52) U.S. Cl.
CPC ........... *H04W 64/00* (2013.01); *H04L 5/0051* (2013.01); *H04W 8/22* (2013.01); *H04W 76/20* (2018.02)

(58) Field of Classification Search
CPC ................................ H04W 64/00; H04W 8/22
See application file for complete search history.

(56) References Cited

U.S. PATENT DOCUMENTS

2021/0329618 A1* 10/2021 Chervyakov ......... G01S 5/0221
2021/0360578 A1* 11/2021 Manolakos ........... G01S 5/0236
2022/0039135 A1* 2/2022 Manolakos ........... H04L 5/0048
2023/0063450 A1* 3/2023 Fakoorian ............. H04W 4/029
(Continued)

FOREIGN PATENT DOCUMENTS

CN 111869156 A 10/2020
CN 112702154 A 4/2021
(Continued)

OTHER PUBLICATIONS

International Search Report and Written Opinion for PCT Appl. No. PCT/CN2021/122021 mailed Apr. 26, 2022 (7 pages).
(Continued)

*Primary Examiner* — Barry W Taylor
(74) *Attorney, Agent, or Firm* — Foley & Lardner LLP

(57) ABSTRACT

Presented are systems and methods for measurements on positioning reference signals. A wireless communication device can receive a first message that includes a configuration of one or more downlink positioning reference signal (DL PRS) resources from a wireless communication element. According to a second message requested by the wireless communication element, the wireless communication device can provide a third message including a location information report derived according to measurements on the one or more DL PRS resources conducted based on the configuration to the wireless communication element.

12 Claims, 11 Drawing Sheets

(56) References Cited

U.S. PATENT DOCUMENTS

| | | | | |
|---|---|---|---|---|
| 2023/0327833 | A1* | 10/2023 | Zou | H04L 5/0051 370/329 |
| 2024/0107487 | A1* | 3/2024 | Manolakos | H04W 24/10 |
| 2024/0137901 | A1* | 4/2024 | Manolakos | H04J 3/0661 |
| 2024/0172170 | A1* | 5/2024 | Manolakos | H04W 64/00 |
| 2024/0356714 | A1* | 10/2024 | Manolakos | H04W 72/11 |
| 2025/0106662 | A1* | 3/2025 | Lee | H04L 1/08 |

FOREIGN PATENT DOCUMENTS

| | | | |
|---|---|---|---|
| CN | 112838916 | A | 5/2021 |
| CN | 113170435 | A | 7/2021 |
| CN | 113383585 | A | 9/2021 |
| WO | WO-2018/019365 | A1 | 2/2018 |
| WO | WO-2020/146820 | A1 | 7/2020 |

OTHER PUBLICATIONS

Extended European Search Report for EP Appl. No. 21958829.0, dated Mar. 28, 2025 (9 pages).
Mitsubishi Electric, "Views on reference signal designs for NR positioning", 3GPP TSG RAN WG1 Meeting #96b, R1-1904600, Apr. 12, 2019, Xi'an, China (8 pages).
Moderator (Huawei), "FL summary #4 of 8.5.4 latency improvements for DL and DL+UL methods", 3GPP TSG-RAN WG1 Meeting #106-e, R1-2108583, Aug. 27, 2021, e-Meeting (77 pages).

* cited by examiner

300

400

600

700

900

SYSTEMS AND METHODS FOR MEASUREMENTS ON POSITIONING REFERENCE SIGNALS

CROSS-REFERENCE TO RELATED APPLICATION

This application claims the benefit of priority under 35 U.S.C. § 120 as a continuation of International Patent Application No. PCT/CN2021/122021, filed on Sep. 30, 2021, the disclosure of which is incorporated herein by reference in its entirety.

TECHNICAL FIELD

The disclosure relates generally to wireless communications, including but not limited to systems and methods for measurements on positioning reference signals.

BACKGROUND

A location server is a physical or logical entity that can collect measurements and other location information from the device and base station, and can utilize the measurements and estimate characteristics such as its position. The location server can process a request from the device and can provide the device with the requested information.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a first message that includes a configuration of one or more downlink positioning reference signal (DL PRS) resources from a wireless communication element. According to a second message requested by the wireless communication element, the wireless communication device can provide a third message including a location information report to the wireless communication element. The location information report may be derived according to measurements on the one or more DL PRS resources conducted based on the configuration.

The wireless communication device can provide User Equipment (UE) capability information including at least one of a Type 1 DL PRS processing capability or a Type 2 DL PRS processing capability to at least one of the wireless communication element or a wireless communication node. The Type 1 DL PRS processing capability can indicate a plurality of combinations of parameters R and P. The parameter R can represent a number of time units that contain the one or more DL PRS resources received within a DL PRS receiving window and the parameter P represents a length of a DL PRS processing window. A DL PRS measurement time window (L) may be formed by the DL PRS processing window (P) and the DL PRS receiving window (L-P). The wireless communication device may not expected to receive the one or more DL PRS resources in the DL PRS processing window.

The Type 2 DL PRS processing capability can indicate a parameter T that represents a DL PRS computation time of the wireless communication device. A time difference (N) within a DL PRS measurement time window (L) may be not less than a value of the parameter T. The time difference N can be measured from an end of a last symbol of a latest one of the DL PRS resources used for the location information report to an end of the DL PRS measurement time window L. The Type 2 DL PRS processing capability further may indicate one or more values of the parameter T, each of which can be determined by the wireless communication device based on a report quantity requested by the wireless communication element.

A wireless communication node can be configured to provide information indicating whether a DL PRS measurement time window is allowed to be configured to the wireless communication device by the wireless communication element. A wireless communication node can be configured to provide information indicating which type of a DL PRS measurement time window is allowed to be requested by the wireless communication element. The configuration of the first message may indicate that an assistance data reference Transmission Reception Point (TRP) should be a TRP where one or more associated DL PRSs are transmitted from a serving cell of the wireless communication device. The first message or second message may indicate that a subset of the one or more DL PRS resources are configured to be measured in a DL PRS measurement time window.

The second message further may include at least a first response time and a second response time. The wireless communication device can be configured to provide the third message including a first location information report before the first response time elapses, and wherein the first location information report may only include measurements conducted in a DL PRS measurement time window. The wireless communication device can be configured to provide the third message including a second location information report before the second response time elapses. The first response time may be less than the second response time. The first response time may be configured for an early location information report. In response to determining that a BWP switching happens during a DL PRS measurement time window, the wireless communication device may not required to provide the first location information report to the wireless communication element. In response to determining that a measurement gap overlaps with a DL PRS measurement time window, the wireless communication device may not required to provide the first location information report to the wireless communication element.

The wireless communication device may be expected to measure one time instance of the one or more DL PRS resources in a DL PRS measurement time window, when the one or more DL PRS resources are configured as periodic. The wireless communication device may be expected to measure a subset of the one or more DL PRS resources in a DL PRS measurement time window that belong to a same positioning frequency layer. The wireless communication device, based on the configuration, may not expected to measure a subset of the one or more DL PRS resources in a DL PRS measurement time window that are not transmitted from a serving cell of the wireless communication device. A search window determined by an expected RSTD and an expected RSTD uncertainty for the subset of DL PRS resources can be greater than a threshold determined based on a cyclic prefix length of the serving cell. In the DL PRS measurement time window, the measurements on the one or more DL PRS resources can be conducted inside an active Bandwidth Part (BWP). The one or more DL PRS resources can each share a same numerology with the active BWP.

At least one aspect is directed to a system, method, apparatus, or a computer-readable medium. A wireless communication element may send a first message that includes a configuration of one or more downlink positioning reference signal (DL PRS) resources to a wireless communication device. The wireless communication element can send a second message to request location information report of the wireless communication device to the wireless communication device. The wireless communication element can receive a third message including a location information report derived according to measurements on the DL PRS resources conducted based on the configuration from the wireless communication device.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
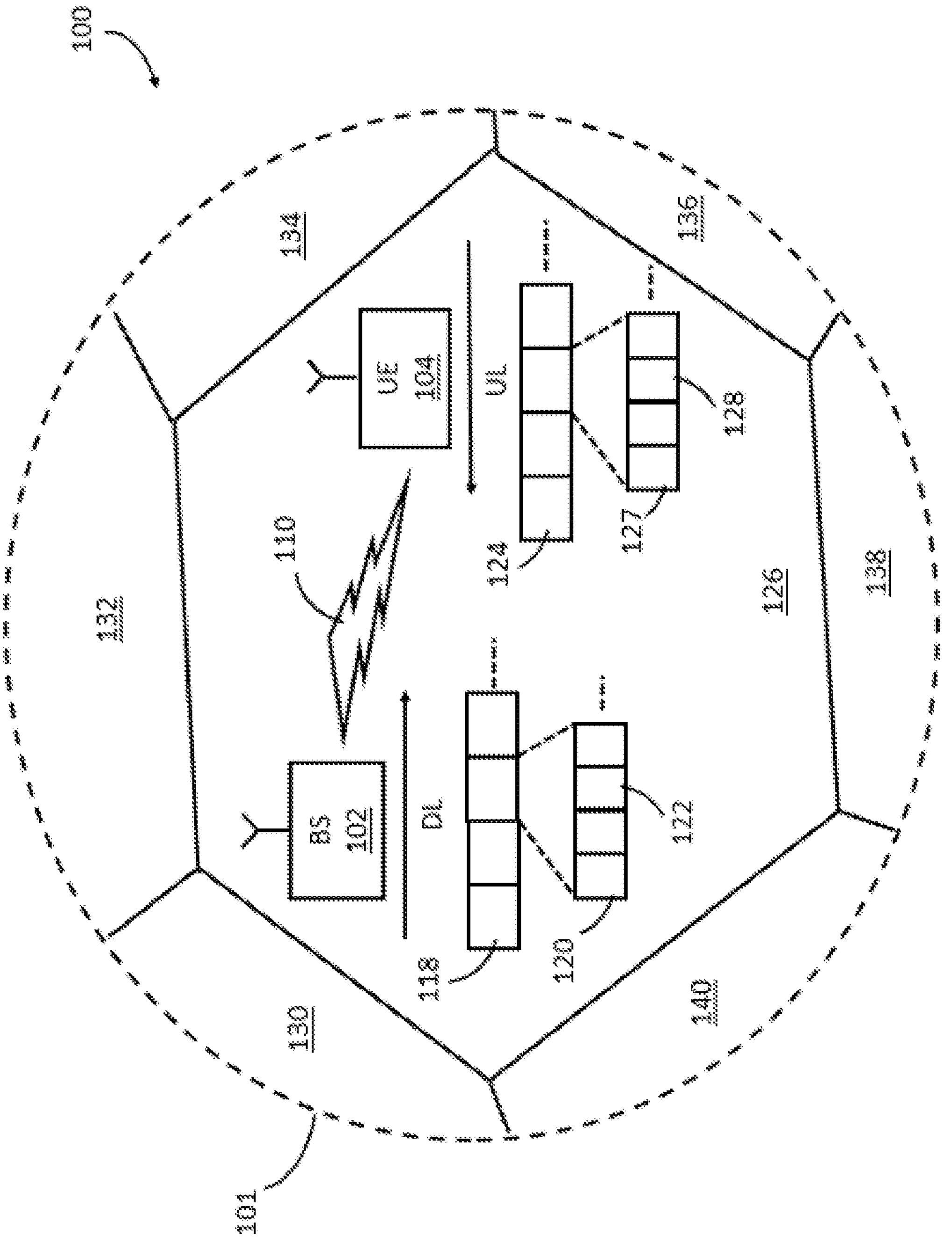
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
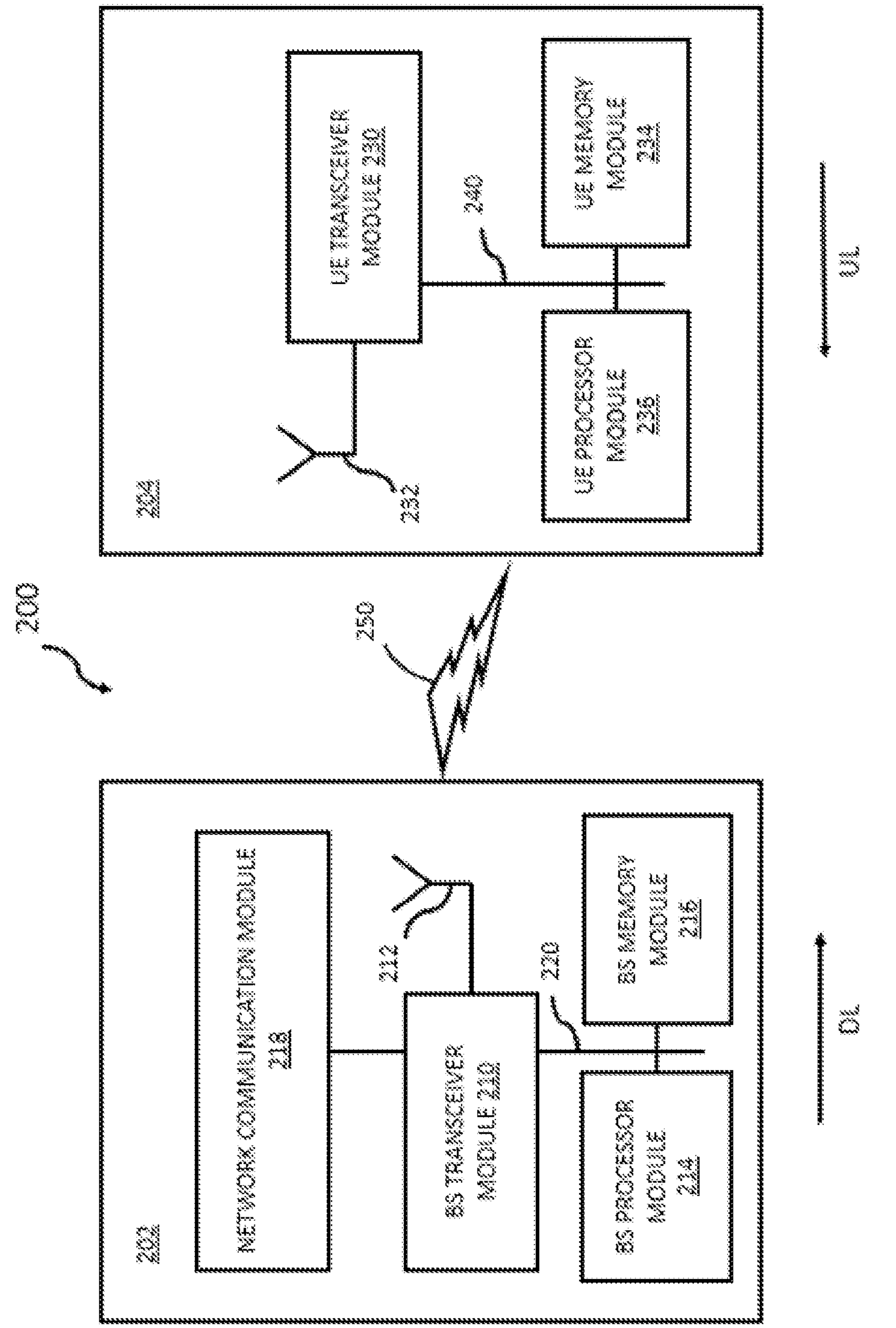
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Measurements on Positioning Reference Signals

In certain systems, user equipment (UE) may be expected to measure/assess/evaluate the downlink positioning reference signal (DL PRS) resource outside the active DL bandwidth part (BWP). In some cases, the UE may be expected to measure the DL PRS with numerology (e.g., carrier spacing) different from the numerology of the active DL BWP, for instance, when making measurements during a configured measurement gap (e.g., measurement time gap). When the UE is expected to measure the DL PRS resource, the UE may request a measurement gap via radio resource control (RRC) signaling from serving gNB (e.g., logical 5G radio node, base station (BS), or wireless communication node). Subsequently, the serving gNB may configure/provide/transmit/modify a measurement gap to/for the UE through RRC signaling. However, having the UE measure the DL PRS resources by requesting a measurement gap from the gNB and receiving the measurement gap from the gNB may introduce/lead to/result in large/high/excessive latency for a location information report. For example, the aforementioned process may introduce the latency due to at least one of a re-tuning time of the UE to enter a measurement gap, the misalignment of the configuration regarding periodicity for measurement gap and DL PRS resource, and/or the procedures/processes/operations for measurement gap request and configuration.

Hence, to reduce the latency for a location information report, the UE can support DL PRS measurement outside the measurement gap. Furthermore, in the DL PRS measurement time window, UE can be able/enabled to conduct DL PRS measurements inside the active DL BWP. The DL PRS can have the same numerology as the active DL BWP during the DL PRS measurement in the DL PRS measurement time window and/or while conducting DL PRS measurements inside the active DL BWP. The systems and methods of this technical solution discussed herein can provide features/functionalities/operations/techniques/methods to configure and report location information based on DL PRS measured in a DL PRS measurement time window.

Figure 3:
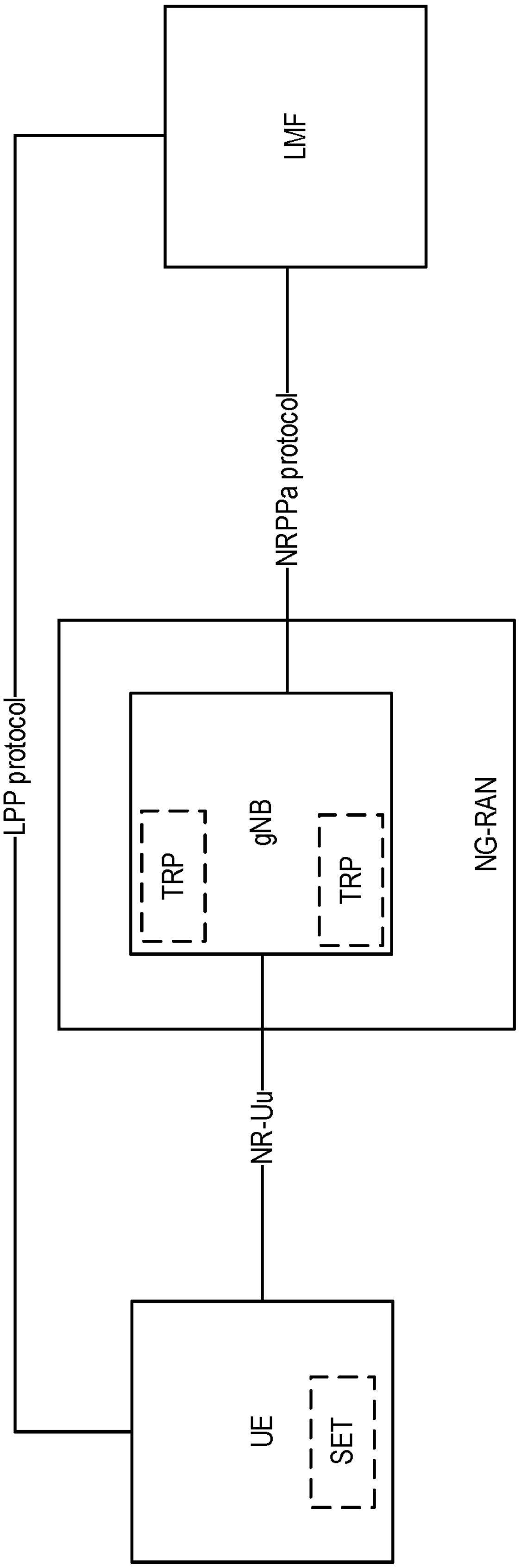
FIG. 3 illustrates example general procedures for the user equipment (UE) to measure a DL PRS and report a location information report in the current new radio (NR) positioning system, in accordance with some embodiments of the present disclosure.

Referring now to FIG. 3, depicted is an example general procedures for the UE to measure a DL PRS and report a location information report in the current new radio (NR) positioning system. The operations/features/functionalities/techniques discussed herein can be performed/operated/initiated/executed/launched by one or more components (e.g., base station 102, user equipment 104, base station 202, user equipment device 204, etc.) of system 100 or 200. Multiple gNBs (e.g., a next generation NodeB (gNB), a base station (BS), the BS 102, the BS 202, a wireless communication node, a cell, a cell tower, a radio access device, a transmit receive point (TRP), etc.) such as a serving gNB and neighbor gNBs may provide a configured DL PRS to a location management function (LMF) via an NR positioning protocol A (NRPPa) protocol/interface in a transmit receive point (TRP) INFORMATION RESPONSE message. Before providing the configured DL PRS to the LMF, the TRP (or gNB-distributed unit (DU)) may provide configured DL PRS to a corresponding gNB (or gNB-centralized unit (CU)) via F1 application protocol (F1AP) protocol in TRP INFORMATION RESPONSE message.

The LMF may provide/configure the DL PRS configuration forwarded by gNBs to the UE via an LTE positioning protocol (LPP) protocol in a Provide AssistanceData message. The LMF may configure some positioning frequency layer(s). In some embodiments, a positioning frequency layer is a collection of DL PRS resource sets across one or more TRPs which have a same sub-carrier spacing (SCS), cyclic prefix (CP) type, center frequency, reference frequency (e.g., point A), configured bandwidth (BW), and comb size.

One or multiple TRPs may be associated with each positioning frequency layer, which can be identified by a TRP identifier/identification (ID) information. One or multiple DL PRS resource sets can be associated with one TRP, which may be identified by a DL PRS resource set ID. One or multiple DL PRS resources may be configured within a DL PRS resource set, which can be identified by a DL PRS resource ID.

In some cases, the TRP may be associated with an expected reference signal time difference (RSTD) value and/or an expected RSTD uncertainty value. The expected RSTD can indicate/represent/include the RSTD value that the UE is expected to measure between the TRP and the assistance data reference TRP. The expected RSTD can account for/take into account the expected propagation time difference and transmit time difference of PRS positioning occasions between the two TRPs. The expected RSTD uncertainty can indicate the uncertainty in expected RSTD value. The uncertainty may be related to the a priori estimate made by the location server (e.g., LMF) of the UE location. The combination of the expected RSTD and expected RSTD uncertainty can represent/indicate/identify the search window for the UE.

In some embodiments, the LMF requires the UE to provide a location information report based on the DL PRS configuration in the ProvideAssistanceData message to derive requested contents indicated in a RequestLocationInformation message. In some implementations, in the RequestLocationInformation message, the LMF may provide a response time, which can indicate the interval between location information reports and the response time requirement for the first location information report. In some cases, the LMF can provide the response time, which can indicate the maximum response time as measured between receipt of the RequestLocationInformation message (or last of ProvideAssistanceData message and RequestLocationInformation message) and transmission of a ProvideLocationInformation message. In some implementations, the LMF may also provide an early fix response time, which can indicate the maximum response time as measured between receipt of the RequestLocationInformation message (or last of ProvideAssistanceData message and RequestLocationInformation message) and transmission of a ProvideLocationInformation message containing early location information report. The LMF can provide the response time and the early fix response time independently or in combination.

In some embodiments, the UE requires measurement gaps for performing the DL PRS measurements while measurement gaps are either not configured or not sufficient, where request signaling is transmitted from the UE to serving gNB via radio resource control (RRC) signaling.

The Serving gNB may provide a measurement configuration to the UE via RRC signaling. The measurement gap configuration may include the measurement gap length (MGL) of the measurement gap, measurement gap repetition period (MGRP) of the measurement gap, and the gap offset of the measurement gap pattern indicated by MGL and MGRP.

In some cases or systems, the DL PRS (e.g., DL PRS resource or DL PRS resource set) may only be allowed to be measured inside the time duration defined by MGL (e.g., measurement gaps). The UE can conduct positioning measurements as requested by the RequestLocationInformation message based on the DL PRS configuration in the ProvideAssistanceData message and the configured measurement gaps. For instance, the UE may be expected to measure the DL PRS resources outside the active DL BWP or with numerology (e.g., carrier spacing) different from the numerology of the active DL BWP if the measurement is made during a configured measurement gap. Accordingly, the location information report can be forwarded/transmitted/sent (e.g, by the UE) to the LMF via the LPP protocol in a ProvideLocationInformation message.

Figure 4:
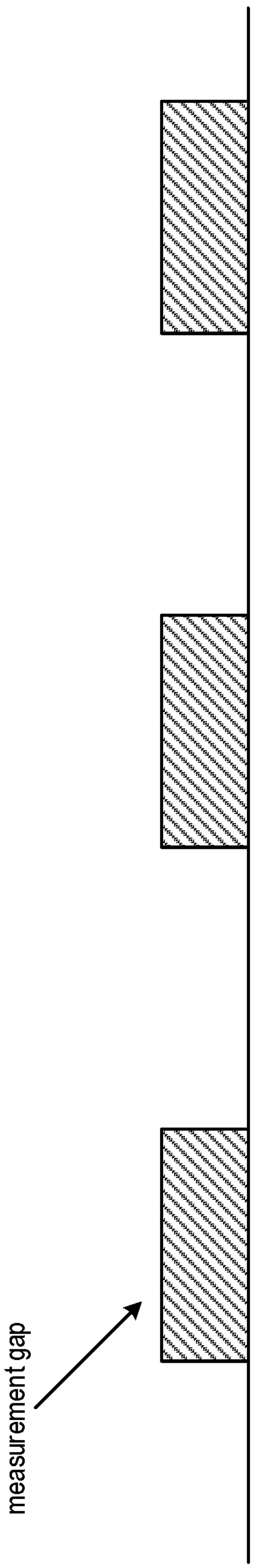
FIG. 4 illustrates an example of measurement gap configuration, in accordance with some embodiments of the present disclosure.

The UE can be configured/supported/enabled to conduct DL PRS measurement in the DL PRS measurement time window. In the DL PRS measurement time window, the UE can be enabled/configured/able to conduct DL PRS measurements inside the active DL BWP. Further, the DL PRS may include the same numerology as the active DL BWP. Referring to FIG. 4, depicted is an example illustration 400 of measurement gap configuration. In conventional designs, the UE (e.g., wireless communication device, client device, or a remote device) may be required to conduct/perform/execute/initiate DL PRS measurements inside one or more measurement gaps. In the measurement gap, the UE may not consider or may not evaluate whether the DL PRS should be configured within active DL BWP and/or has the same numerology as the active DL BWP. However, to improve or avoid latency from conducting the DL PRS measurement inside the measurement gap, the UE can perform features or functionalities discussed herein to support/enable DL PRS measurement outside the measurement gap.

Figure 5:
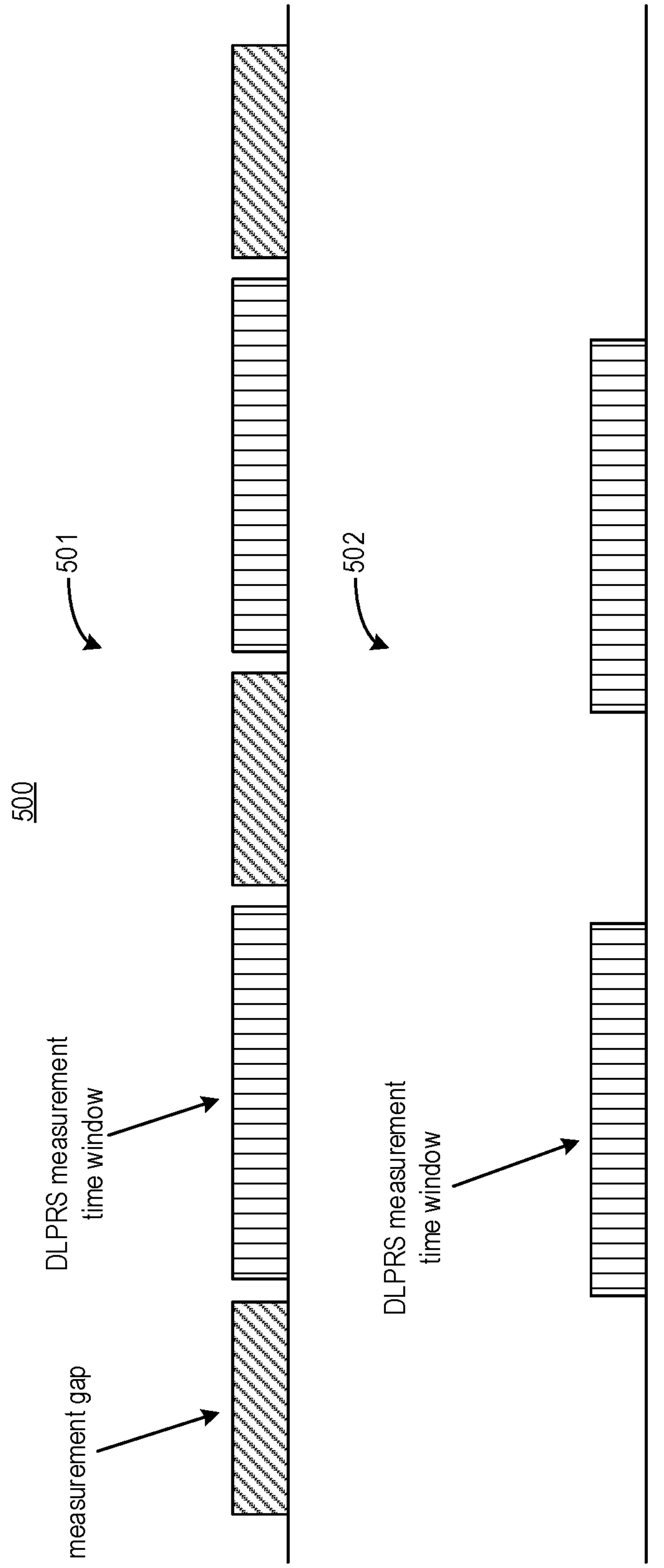
FIG. 5 illustrates an example of DL PRS measurement time window configurations, in accordance with some embodiments of the present disclosure.

Referring to FIG. 5, depicted is an example illustration 500 of DL PRS measurement time window configurations. The UE can conduct DL PRS measurements in one or more DL PRS measurement time windows, as in configuration 501 and/or configuration 502. For example, configuration 501 can include/introduce/provide/be configured with both the measurement gap and DL PRS measurement time window. In another example, the configuration 502 can include only the DL PRS measurement time window (e.g., without the measurement gap). The configuration 502 for the DL PRS measurement time window may be based on one or more conditions. For instance, in configuration 502, a first condition can include the UE may only measure DL PRS in active DL BWP. In this case, the first condition can indicate that the whole frequency (e.g., entire frequency or all frequency) of the DL PRS should be within the active DL BWP, such that the UE can conduct the measurement on the whole frequency of the DL PRS. In some cases, the first conduction can indicate that only a part of the frequency of the DL PRS is within (or overlapped with) the active DL BWP, such that the UE may only conduct the measurement on a part of the frequency of the DL PRS that is within the active DL BWP). A second condition can include the DL PRS may include (or be configured with) the same numerology as active DL BWP. A third condition can include the DL PRS may be/should be measured outside measurement gap, such as if measurement gap is configured. Other conditions can be introduce for the configuration of 502. The configuration 502 can include at least one or a combination of more than one conditions.

The UE can provide capability information to LMF (e.g., wireless communication element or remote component) via LPP message. The UE capability information can include the types of DL PRS measurement time window (e.g., the first type of DL PRS measurement time window and/or the second type of DL PRS measurement time window) that are supported by the UE. For instance, the UE capability information can include/indicate at least one of the two types of DL PRS measurement time window supported by UE. The first type (Type 1) of DL PRS measurement time window can prioritize DL PRS measurement/reception over other DL signals/channels (e.g., CSI-RS, PDSCH, PDCCH, etc.) in all symbols inside the DL PRS measurement time window. The other DL signals/channels may be from at least one of all carriers/serving cells of the UE, all carriers in the same frequency band of the UE, or one carrier of the UE.

In further example, the second type (Type 2) of DL PRS measurement time window can prioritize the DL PRS measurement/reception over other DL signals/channels only in the symbols inside the window that are configured with DL PRS. The other DL signals/channels may be from at least one of all carriers/serving cells of the UE, all carriers in the same frequency band of the UE, or one carrier of the UE.

Figure 6:
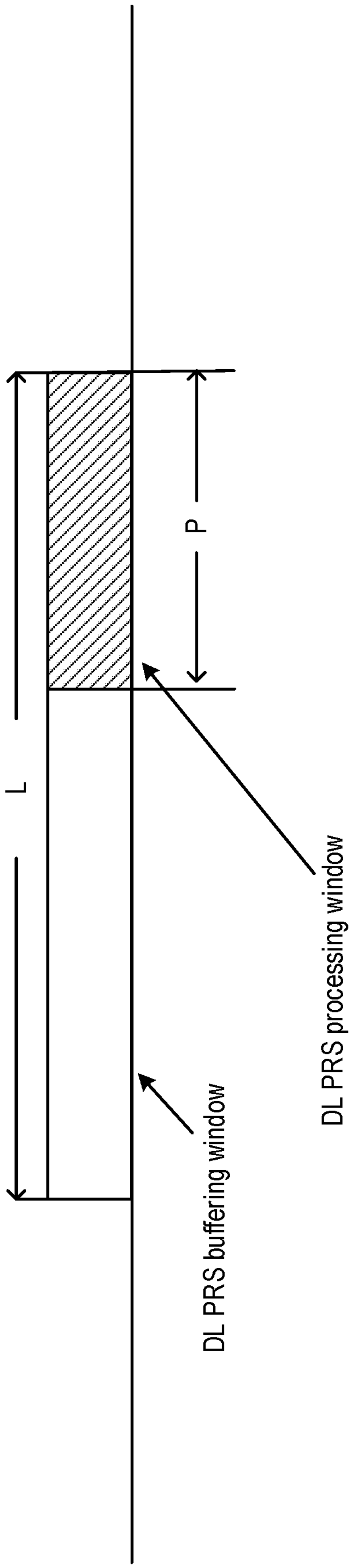
FIG. 6 illustrates an example of a first type of DL PRS processing capability in a DL PRS measurement time window, in accordance with some embodiments of the present disclosure.

Referring to FIG. 6, depicted is an example illustration 600 of the first type of DL PRS processing capability. In the first type of DL PRS processing capability, the UE capability information may provide multiple/various combinations of {R, P}. The R and P can denote/represent/be associated with values which can represent/define/describe a DL PRS processing window (e.g., the duration P in millisecond (ms)) can process up to R ms (e.g, resources) of symbols/slots/subframes containing DL PRS resource(s) (or configured with DL PRS resource(s)) expected to be received by the UE in a DL PRS buffering window. For example, for an NR system, the time duration for a subframe may be 1 ms. If there are 5 subframes containing DL PRS resources in a DL PRS buffering window, the value of (or represented by) R' can be 5 ms. The value of R' may not be expected to be larger than the R value provided by the UE capability information (e.g., since the UE processes up to R ms of subframes containing DL PRS resource(s)). The {R, P} may be provided per frequency band (or per carrier) as discussed herein, which can indicate that the UE has/supports different DL PRS processing capabilities in different frequency bands (or carriers) so the UE may support/declare different {R,P} for different frequency bands (or carriers).

In some implementations, the DL PRS measurement time window (e.g., the time duration can be denoted by L) may be divided into two time windows. The first window can be a DL PRS buffering window (or DL PRS receiving window) and a second window can be a DL PRS processing window (or DL PRS computation window) (e.g., the time duration may be denoted by P). The PRS processing window may start after (e.g., right after or immediately after) the end of the PRS buffering window. In some cases, the UE may only expect/anticipate to receive DL PRS in DL PRS buffering window. In some other cases, the UE may not be expected to receive DL PRS in DL PRS processing window. For example, the UE can process the DL PRS expected to be received in the DL PRS buffering window. The UE may not be able to process an excessive amount/too much/high quantity of DL PRS expected to be received in the DL PRS buffering window. Hence, the UE may provide its capability information (e.g., capability information of the UE) to take the time of the DL PRS processing window to process DL PRS expected to be received in the DL PRS buffering window. Accordingly, the {R,P} can represent/indicate/mean that, in a DL PRS measurement time window, the UE is configured to consume/take P ms (e.g., the duration of DL PRS processing window) to process up to R ms (or time units) of symbols/slots/subframes containing DL PRS resources expected to be received in the DL PRS buffering window.

Figure 7:
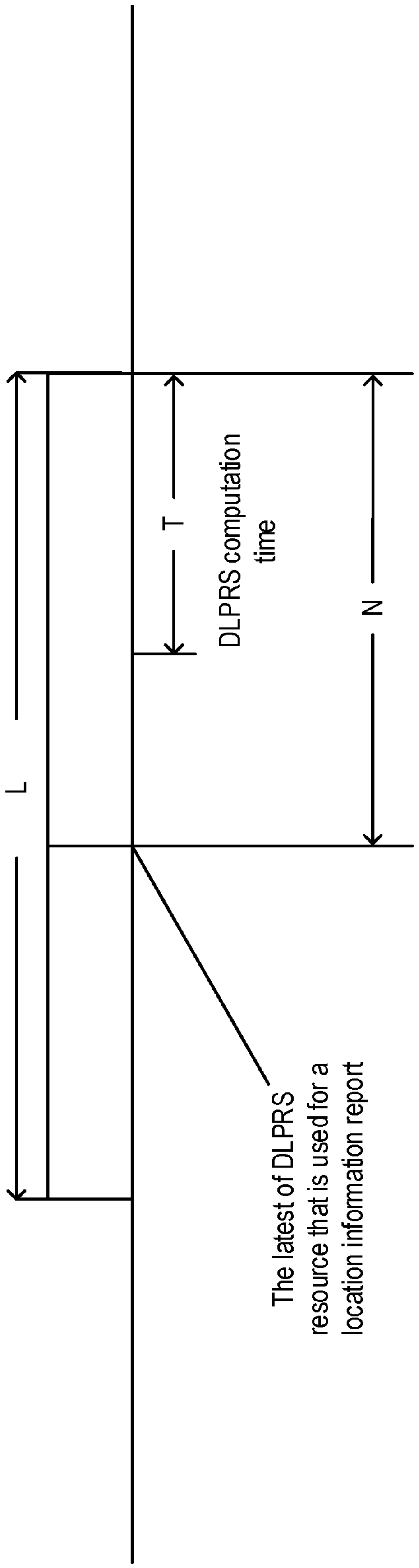
FIG. 7 illustrates an example of a second type of DL PRS processing capability DL PRS measurement time window, in accordance with some embodiments of the present disclosure.

Referring to FIG. 7, depicted is an example illustration 700 of a second type of DL PRS processing capability. In the second type of DL PRS processing capability, the UE capability information can provide the DL PRS computation time T. For example, the DL PRS computation time T can represent/indicate the minimum computation time for the latest DL PRS resource that is used for a location information report. A time difference (N) within a DL PRS measurement time window (L) may not/should not be less than DL PRS computation time T, where the time difference N may be measured from an end of a last symbol of the latest DL PRS resource used for the location information report to an end of the DL PRS measurement time window L.

The UE may provide multiple values of T, such as T1, T2, T3, etc. The value of T that is applied may depend on the report quantity requested LMF. As an example, if RequestLocationInformation message requests the UE to provide DL PRS reference signal received power (RSRP) based on the measurement of DL PRS, the UE may apply a first T value (e.g., T1). In another example, if RequestLocationInformation message requests the UE to provide Downlink Reference Signal Time Difference (DL-RSTD) or the UE receive-transmit (Rx-Tx) time difference based on the measurement of DL PRS, the UE may apply a second T value (e.g., T2). In these examples, the value of T1 may be smaller than the value of T2.

In some cases, the UE capability information can include/indicate/provide whether the UE supports either one of or both Type 1 DL PRS processing capability and Type 2 DL PRS processing capability. In some cases, the UE capability information may also be provided to serving gNB (e.g., wireless communication node or base station) via RRC signaling.

In some implementations, serving gNB may provide one or more information to LMF via NR Positioning Protocol A (NRPPa) message. In some cases, the serving gNB may be an intermediary between the UE and the LMF or a device/component facilitating the communication between the UE and the LMF, for example. The one or more information can be included in at least one of a POSITIONING INFORMATION RESPONSE message or POSITIONING INFORMATION UPDATE message, for example. In a first example, the information can include the frequency information of serving cells of a UE. In some cases, the frequency information can be of DL active bandwidth part(s) (BWP) of each serving cell. In a second example, the serving gNB may provide the information to the LMF indicating whether the DL PRS measurement time window is allowed to be configured to the UE by the LMF. In a third example, the serving gNB may provide information indicating what types of DL PRS measurement time window is allowed/suggested to be requested by LMF (e.g., the first type of DL PRS measurement time window and/or the second type of DL PRS measurement time window). In a fourth example, the serving gNB may provide the information to the LMF indicating the start time and/or duration (e.g., the maximum duration) of a DL PRS measurement time that is allowed/suggested to be configured to the UE by the LMF. The gNB can provide at least one of the aforementioned information to the LMF. In some cases, the gNB can provide other information to the LMF, such as interaction/communication/policy information between the LMF and the UE.

The LMF can provide a DL PRS configuration to the UE via Provide AssistanceData message (e.g., assistance data or a first message to the UE). The assistance data reference TRP provided in the DL PRS configuration may correspond to/include the TRP where the associated DL PRS is transmitted from a serving cell of the UE. In some cases, the UE may assume that the DL PRS associated with a TRP that is transmitted from a serving cell of the UE if Physical Cell ID, Cell Global ID, and ARFCN associated with the TRP (e.g., if provided) are the same as the corresponding information of the serving cell.

The LMF can send a location information request to the UE via RequestLocationInformation message (e.g., location information request or a second message). The LMF may provide or send the DL PRS configuration and/or the location information request to the UE subsequent to receiving the capability information from the UE via LPP message and/or receiving information via the NRPPa message from the serving gNB.

The RequestLocationInformation message (e.g., first message) or ProvideAssistanceData (e.g., second message) message may indicate a subset of DL PRS resources, e.g., from the DL PRS configuration (e.g., indicated by one or more identifier (IDs) referred to the DL PRS resources provided in the DL PRS configuration). For example, the subset of DL PRS resources may be measured in the DL PRS measurement time window, where the UE conducts DL PRS measurements inside active DL BWP. All the DL PRS resources in the subset should have the same numerology (e.g., carrier spacing) as the active DL BWP. In some cases, the information of the subset of DL PRS resources should also be provided to serving gNB.

Figure 8:
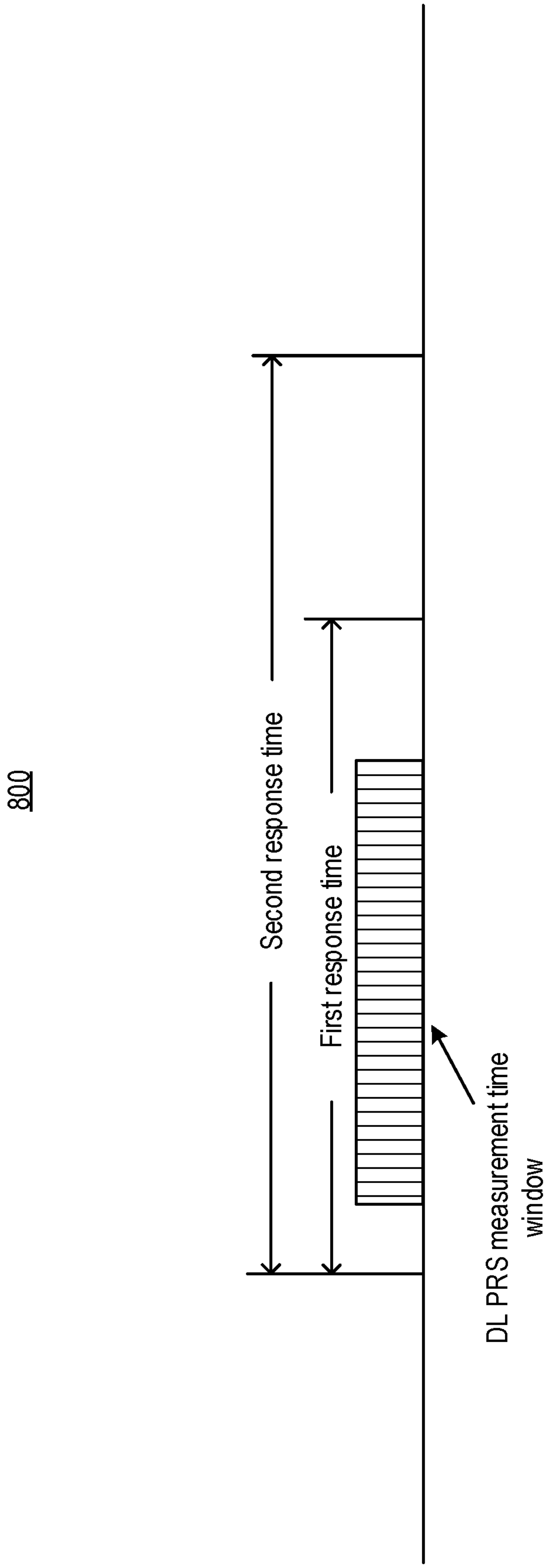
FIG. 8 illustrates an example of response time configurations, in accordance with some embodiments of the present disclosure.

The request message from the LMF may include/indicate/provide/show various response times. Referring to FIG. 8, depicted is an example illustration 800 of response time configurations. For instance, the request message from the LMF can be configured with two response times. As an example, for the first response time, the UE may provide a first location information report before the first response time elapses based on the DL PRS measured in the DL PRS measurement time window. The first location information report only include measurements conducted in a DL PRS measurement time window based on the DL PRS measured inside DL active BWP. The DL PRS may include/have the same numerology as the active DL BWP.

In another example, for the second response time, the UE may provide a second location information report before the second response time. The UE may not be required to conduct DL PRS measurement in the DL PRS measurement time window for the second location information report. The UE may conduct DL PRS measurements inside or outside the measurement gap for the second location information report. The first response time can be smaller than the second response time or the second response time can be greater than the first response time. For example, the first response time can be a response time configured for an early location information report (e.g., the early fix response time).

In some cases, if DL BWP switching occurred/executed/initiated/happened during the DL PRS measurement time window, the UE may not be required to provide the first location information report to the LMF. In some implementations, if there is at least a measurement gap overlapped/positioned in/collided with the DL PRS measurement time window, the UE may not be required to provide the first location information report to the LMF.

The request message (e.g., the second message) from the LMF may indicate the type of DL PRS measurement time window (e.g., the first type of DL PRS measurement time window or the second type of DL PRS measurement time window) that the UE should/may use/apply/incorporate/initiate to conduct the DL PRS measurement. The request message may indicate the configuration of a DL PRS measurement time window. For instance, a configuration of the DL PRS measurement time windows can be shown in at least FIG. 9.

Figure 9:
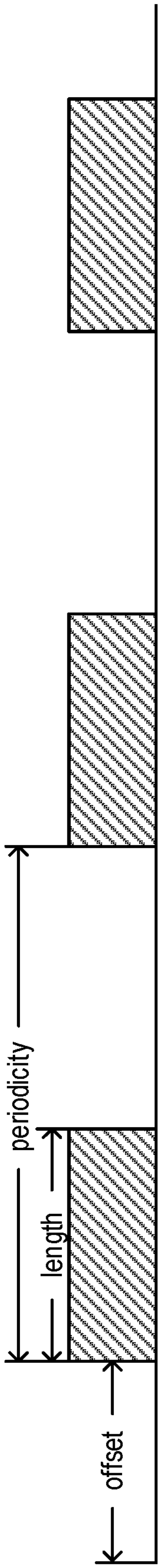
FIG. 9 illustrates an example of the configuration of the DL PRS measurement time window, in accordance with some embodiments of the present disclosure.

Referring to FIG. 9, depicted is an example illustration 900 of a configuration of the DL PRS measurement time window. Illustration 900 can include at least periodicity, length, offset and repetition number of the DL PRS measurement time window. For example, the periodicity of the DL PRS measurement time window (e.g., sometimes generally referred to as time window periodicity) can include/correspond to/represent the repetition period of a measurement time window. The repetition period of the measurement time window can indicate the time between two consecutive measurement time repetitions. The repetition period may be similar to or the same as response time (e.g, the second response time).

In another example, the length of the DL PRS measurement time window can correspond to a time duration that may be the same as a response time (e.g., the first response time) or a value related to/associated with/based on the response time (e.g., the ratio between the time duration and the response time may be fixed or configured by the LMF, or the time duration may be equal to the response time minus a value of Q, where the value of Q may be fixed or configured by LMF). The start time (or the offset) of the DL PRS measurement time window may be indicated by a system frame number (SFN) and/or a slot number.

In further example, the configuration of the DL PRS measurement time window can include a repetition number. The repetition number (e.g., the number of repetitions of the measurement time window) can include a value of at least one of {1, 2, 3, . . . , N, infinite}. The N can represent N repetitions of the measurement time window. The infinite value can indicate that there may not be a limitation on the repetition number of the measurement time window.

In some implementations, the LMF can send information configured by the LMF to a serving gNB. For instance, the LMF can send information including at least one of the type of DL PRS measurement time window (e.g., the first type of DL PRS measurement time window or the second type of DL PRS measurement time window) sent by the second message from LMF to UE, the configuration of a DL PRS measurement time window, and/or response time for a location information report. In response to receiving the information from the LMF, the UE can conduct the DL PRS measurement. The UE can send the location information report as requested by LMF in response to/according to the conducted DL PRS measurements.

In some implementations, for a periodic DL PRS, the UE may only be expected to measure a one-time instance of the DL PRS in a DL PRS measurement time window. In some cases, in the DL PRS measurement time window, UE may only be expected to measure DL PRS from one positioning frequency layer. In some other cases, in the DL PRS measurement time window, the UE may not be expected to measure the DL PRS that is not transmitted from a serving cell of the UE. For instance, the UE may not be expected to measure the DL PRS that is not transmitted from a serving cell if the search window, determined by an expected RSTD value and an expected RSTD uncertainty value associated with a TRP to transmit the DL PRS, is larger than a threshold. The threshold may be associated with/related to/correspond to the cyclic prefix length determined by the serving cell.

In some cases, if a measurement gap collides with the DL PRS measurement time window, the UE may ignore/disregard the measurement gap. In some other cases, if a measurement gap collides with the DL PRS measurement time window, the UE may not apply the measurement gap. In some implementations, in a location information report message (e.g., third message), the UE can indicate whether the location information report is based on the measurements conducted in the DL PRS measurement time window.

In some implementations, the serving gNB may indicate certain information to the UE, such as for the UE to conduct DL PRS measurement in RRC inactive state. For instance, the information indicated to the UE by the serving gNB may include at least one of i) the DL PRS reception is prioritized over other downlink channels/signals when they are overlapped in time (e.g., in cases when the UE is in an active period for small data transmission), ii) the DL PRS measurement should be inside the DL BWP (e.g., the BWP can be an initial BWP or a dedicated BWP for small data transmission), iii) the UE is not allowed to receive the DL PRS when the UE is in an active period for small data transmission, or iv) the UE is only allowed to report the DL PRS measurements conducted before the start of an active period for small data transmission when the UE provides a location information report in an active period for small data transmission. The information may be included in an RRC release message.

Figure 10:
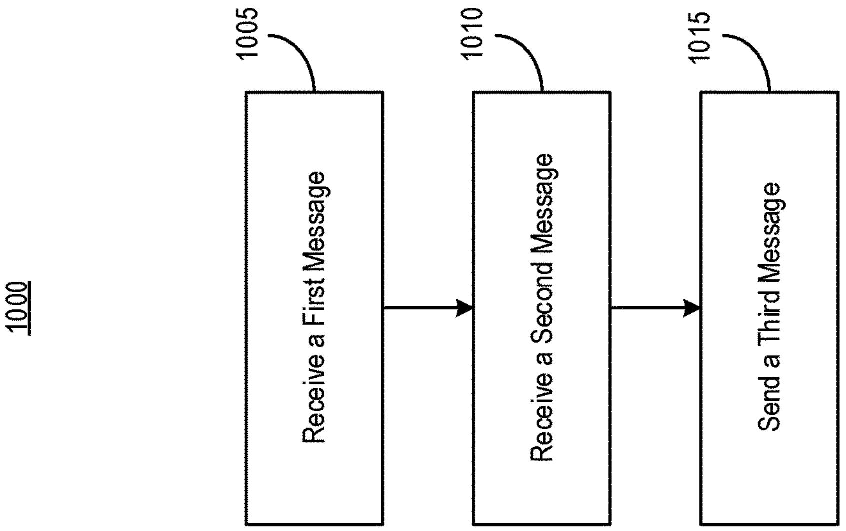
FIGS. 10-11 illustrate flow diagrams of example methods for measurements on positioning reference signals, in accordance with an embodiment of the present disclosure.

Referring to FIG. 10, depicted is a flow diagram of an example method for measurements on positioning reference signals by the UE. The method 1000 may be implemented using any of the components and devices detailed herein in conjunction with FIGS. 1-2. The method 1000 may include operations/techniques/features/functionalities similar to/as part of/in addition to operations described in conjunction with at least FIGS. 3-9. In overview, the method 1000 can include receiving a first message (1005). The method 1000 can include receiving a second message (1010). The method 100 can include sending a third message (1015).

Referring now to operation (1005), and in some implementations, a wireless communication device (e.g., the UE) can receive a first message (e.g., ProvideAssistanceData message) from a wireless communication element (e.g., LMF). The first message can include a configuration of one or more downlink positioning reference signal (DL PRS) resources. The first message may be transparent to a wireless communication node (e.g., serving gNB). Prior to receiving the first message from the wireless communication element, the wireless communication device can transmit/send/forward/provide information to at least one of the wireless communication element or a wireless communication node (e.g., gNB). For instance, the wireless communication device can provide UE capability information to at least one of the wireless communication element or the wireless communication node. The UE capability information can include at least one of a Type 1 DL PRS processing capability or a Type 2 DL PRS processing capability.

The type 1 DL PRS processing capability can indicate/represent multiple combinations of parameters R and P (e.g., {R, P}. The parameter R may represent a number of time units (e.g., symbols, slots, or subframes) that contain the one or more DL PRS resources in a DL PRS receiving window. The parameter P may represent a length of a DL PRS processing window. A DL PRS measurement time window (e.g., denoted as L) can be formed/constructed/determined/represented by the DL PRS processing window (e.g., denoted as P) and the DL PRS receiving window (e.g., L-P). In some cases, the wireless communication device may not be expected to receive the one or more DL PRS resources in the DL PRS processing window.

The type 2 DL PRS processing capability can indicate a parameter T. The parameter T can represent a DL PRS computation time of the wireless communication device. For example, a time difference (N) may not be less than a value of the parameter T. The time difference N can be measured/start from an end of the last symbol of the latest one of the DL PRS resources used for the location information report to an end of the DL PRS measurement time window L, where the latest one of the DL PRS resources may also be received in the DL PRS measurement time window L. The Type 2 DL PRS processing capability may indicate one or more values of the parameter T, where each of the values can be determined by the wireless communication device. For example, the wireless communication device can determine the individual values of parameter T based on a report quantity requested by the wireless communication element.

In some cases, the wireless communication node can be configured/instructed to provide information indicating whether a DL PRS measurement time window is allowed to be configured/modified to the wireless communication device by the wireless communication element. In some implementations, the wireless communication node may be configured to provide information to the wireless communication device indicating which type of a DL PRS measurement time window is allowed to be requested by the wireless communication element. For example, the type of window can include/refer to one or more types of DL PRS processing capabilities, such as a first type (Type 1) or a second type (Type 2). In type 1, the DL PRS measurement/reception may be prioritized over all other DL signals/channels (e.g., CSI-RS, PDSCH, PDCCH, etc.) in all symbols inside the DL PRS measurement time window. In this type, the other DL signals/channels may be from at least one of i) all carriers (or all serving cells) of the UE, ii) all carriers (or all serving cells) in a same frequency band of the UE, or iii) one carrier (or serving cell) of the UE. In further example, in type 2, the DL PRS measurement/reception may be prioritized over other DL signals/channels only in the symbols inside the window that are configured with DL PRS. In type 2, the other DL signals/channels can be from at least one of i) all carriers (or all serving cells) of the UE, ii) all carriers (or all serving cells) in a same frequency band of the UE, or iii) one carrier (or serving cell) of the UE.

In some implementations, the configuration of the first message can indicate that an assistance data reference Transmission Reception Point (TRP) should be a TRP where one or more associated DL PRSs are transmitted from a serving cell of the wireless communication device. For example, the expected RSTD can indicate the RSTD value that the UE is expected to measure between the TRP and the assistance data reference TRP. The assistance data reference TRP can be selected by the protocol without restrictions. The assistance data reference TRP may be configured/defined as the TRP that transmits DL PRS from serving cell, such that the expected RSTD can be understood/acknowledged/identified by the time difference between receiving DL PRS transmitted from the serving cell and the DL PRS not transmitted from the serving cell. Hence, the expected RSTD can assist the UE to determine/decide whether the DL PRS that is not transmitted from the serving cell should be measured (or not measured). In further example, in a DL PRS measurement time window, the UE may not be expected to measure the DL PRS that is not transmitted from a serving cell, such as in cases where the search window, determined by the expected RSTD and expected RSTD uncertainty for the DL PRS, is greater/larger than a threshold. For example, the threshold can be associated with/correspond to the cyclic prefix length determined by a serving cell.

Referring to operation (1010), and in some implementations, the wireless communication device can receive a second message (e.g., RequestLocationInformation message) from the wireless communication element. For example, the second message may include at least a first response time and a second response time. In some cases, the first response time may be less than the second response time. In some cases, the first response time can be configured for an early location information report.

In some implementations, in response to determining that a BWP switching happens during a DL PRS measurement time window, the wireless communication device may not be required to provide the first location information report to the wireless communication element. In some cases, in response to determining that a measurement gap overlaps/collides with a DL PRS measurement time window, the wireless communication device may not be required to provide the first location information report to the wireless communication element. In some cases, the first message and/or the second message can indicate that a subset of the one or more DL PRS resources is configured to be measured in a DL PRS measurement time window. The subset can include one or more DL PRS resources.

Referring to operation (1015), and in some implementations, the wireless communication device can provide a third message (e.g., ProvideLocationInformation) to the wireless communication element according to the second message requested by the wireless communication element. The third message can include at least a location information report derived according to measurements on the one or more DL PRS resources conducted based on the configuration of the first message.

In some implementations, the wireless communication device can be configured to provide/transmit/send the third message including a first location information report before the first response time elapses. In these implementations, the first location information report may only include measurements conducted in a DL PRS measurement time window. In some cases, the wireless communication device may be configured to provide the third message including a second location information report before the second response time elapses.

In some implementations, the wireless communication device may be expected to measure a one-time instance of the one or more DL PRS resources in a DL PRS measurement time window. For instance, the wireless communication device can be configured to measure the one-time instance when the one or more DL PRS resources are configured as periodic. In some implementations, the wireless communication device may be expected to measure one or more DL PRS resources in a DL PRS measurement time window that belong to a same positioning frequency layer.

In some cases, the wireless communication device may not be expected to measure the one or more DL PRS resources in a DL PRS measurement time window that are not transmitted from a serving cell of the wireless communication device, such as based on the configuration of the first message. For example, a search window determined by an expected RSTD and an expected RSTD uncertainty for the subset of DL PRS resources may be greater than a threshold. The threshold can be determined based on/associated with a cyclic prefix length of the serving cell.

In some implementations, in the DL PRS measurement time window, the measurements on the one or more DL PRS resources may be conducted inside an active Bandwidth Part (BWP). For instance, the one or more DL PRS resources may each share the same numerology with the active BWP. In some cases, the duration of the DL PRS measurement time window may be determined according to/based on a response time provided in the second message. In some implementations, the wireless communication device can receive an indication from the wireless communication node that the reception of the one or more DL PRS resources is prioritized over other downlink channels or that signals overlapped in time when the wireless communication device is in RRC inactive state.

Figure 11:
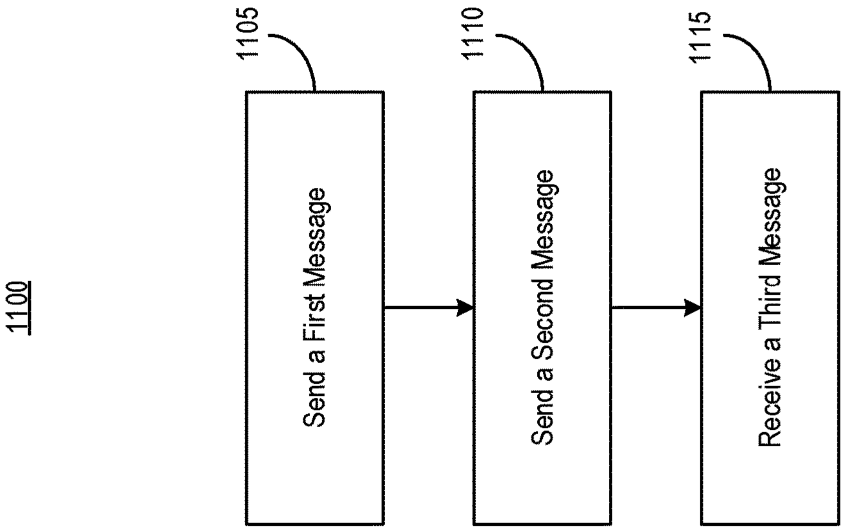

Referring to FIG. 11, depicted is a flow diagram of an example method for measurements on positioning reference signals by the LMF. The method 1100 may be implemented using any of the components and devices detailed herein in conjunction with FIGS. 1-2. The method 1100 may include operations/techniques/features/functionalities similar to/as part of/in addition to operations described in conjunction with at least FIGS. 3-10. In overview, the method 1100 can include sending a first message (1105). The method 1100 can include sending a second message (1110). The method 1100 can include receiving a third message (1115).

Referring to operation (1105), a wireless communication element can send/transmit/provide a first message to a wireless communication device. The first message can include a configuration of one or more downlink positioning reference signal (DL PRS) resources. The first message sent by the wireless communication element can be similar to the first element of operation (1005) received by the wireless communication device, for example.

Referring to operation (1110), the wireless communication element can send a second message to the wireless communication device. The second message can be a request message to request the location information report of the wireless communication device. The second message sent by the wireless communication element can be similar to the second message received by the wireless communication device in operation (1010), for example.

Referring to operation (1115), the wireless communication element can receive/obtain/retrieve a third message from the wireless communication device. The third message can include a location information report derived according to measurements on the DL PRS resources conducted based on the configuration. The third message received by the wireless communication element can be similar to the third message sent by the wireless communication device in operation (1015), for example.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A wireless communication method, comprising:

receiving, by a wireless communication device from a wireless communication element, a first message that includes a configuration of one or more downlink positioning reference signal (DL PRS) resources; and according to a second message from the wireless communication element, providing, by the wireless communication device to the wireless communication element, a third message including location information derived according to measurements on the one or more DL PRS resources conducted based on the configuration, wherein the wireless communication device, based on the configuration, forgoes measurement of the one or more DL PRS resources in a DL PRS measurement time window that are outside of a serving cell of the wireless communication device, and wherein an expected reference signal time difference (RSTD) and an expected RSTD uncertainty for the one or more DL PRS resources is greater than a threshold associated with a cyclic prefix length of the serving cell.

2. The wireless communication method of claim 1, further comprising:

providing, by the wireless communication device to the wireless communication element, User Equipment (UE) capability information including at least one of a Type 1 DL PRS processing duration or a Type 2 DL PRS processing duration of the wireless communication device.

3. The wireless communication method of claim 2, wherein the Type 1 DL PRS processing duration indicates a plurality of combinations of parameters R and P, wherein the parameter R indicates a duration of the one or more DL PRS resources in a DL PRS receiving window that the wireless communication device can process, and the parameter P represents a length of a DL PRS processing window, wherein a respective combination of {R, P} indicates that the wireless communication device can process up to R ms of DL PRS resources in P ms within the DL PRS receiving window.

4. The wireless communication method of claim 3, wherein the DL PRS processing window starts after an end of a PRS buffering window.

5. The wireless communication method of claim 1, wherein a fourth message indicates that a subset of the one or more DL PRS resources are configured to be measured in the DL PRS measurement time window.

6. A wireless communication method, comprising:

sending, by a wireless communication element to a wireless communication device, a first message that includes a configuration of one or more downlink positioning reference signal (DL PRS) resources; and receiving, by the wireless communication element from the wireless communication device, according to a second message from the wireless communication element, a third message including location information derived according to measurements on the one or more DL PRS resources conducted based on the configuration, wherein the wireless communication device, based on the configuration, forgoes measurement of the one or more DL PRS resources in a DL PRS measurement time window that are outside of a serving cell of the wireless communication device, and wherein an expected reference signal time difference (RSTD) and an expected RSTD uncertainty for the one or more DL PRS resources is greater than a threshold associated with a cyclic prefix length of the serving cell.

7. The wireless communication method of claim 6, further comprising:

receiving, by the wireless communication element from the wireless communication device, User Equipment, UE, capability information including at least one of a Type 1 DL PRS processing duration or a Type 2 DL PRS processing duration of the wireless communication device.

8. The wireless communication method of claim 7, wherein the Type 1 DL PRS processing duration indicates a plurality of combinations of parameters R and P, wherein the parameter R indicates a duration of the one or more DL PRS resources in a DL PRS receiving window that the wireless communication device can process, and the parameter P represents a length of a DL PRS processing window, wherein a respective combination of {R, P} indicates that the wireless communication device can process up to R ms of DL PRS resource in P ms.

9. The wireless communication method of claim 8, wherein the DL PRS processing window starts after an end of a PRS buffering window.

10. The wireless communication method of claim 6, wherein a fourth message indicates that a subset of the one or more DL PRS resources are configured to be measured in the DL PRS measurement time window.

11. A wireless communication device, comprising:

at least one processor configured to:

receive, via a receiver, from a wireless communication element, a first message that includes a configuration of one or more downlink positioning reference signal (DL PRS) resources; and according to a second message requested by the wireless communication element, provide, via a transmitter to the wireless communication element, a third message including location information derived according to measurements on the one or more DL PRS resources conducted based on the configuration, wherein the at least one processor, based on the configuration, forgoes measurement of the one or more DL PRS resources in a DL PRS measurement time window that are outside of a serving cell of the wireless communication device, and wherein an expected reference signal time difference (RSTD) and an expected RSTD uncertainty for the one or more DL PRS resources is greater than a threshold associated with a cyclic prefix length of the serving cell.

12. A wireless communication element, comprising:

at least one processor configured to:

send, via a transmitter to a wireless communication device, a first message that includes a configuration of one or more downlink positioning reference signal (DL PRS) resources; and receive, via a receiver, from the wireless communication device, a third message including location information derived according to measurements on the one or more DL PRS resources conducted based on the configuration, wherein the wireless communication device, based on the configuration, forgoes measurement of the one or more DL PRS resources in a DL PRS measurement time window that are outside of a serving cell of the wireless communication device, and wherein an expected reference signal time difference (RSTD) and an expected RSTD uncertainty for the one or more DL PRS resources is greater than a threshold associated with a cyclic prefix length of the serving cell.

* * * * *